United States Patent [19]
Kleinschmager

[11] 3,754,995
[45] Aug. 28, 1973

[54] HIGH TEMPERATURE FUEL CELL

[75] Inventor: Herbert Kleinschmager, Eppelheim, Germany

[73] Assignee: Brown, Boveri & Cie AG, Postfach, Mannheim, Germany

[22] Filed: May 16, 1972

[21] Appl. No.: 253,861

[30] Foreign Application Priority Data
May 19, 1971 Germany............... P 21 24 814.6

[52] U.S. Cl............... 136/86 R, 136/86 D, 136/153
[51] Int. Cl. ........................................ H01m 27/00
[58] Field of Search.......... 136/86 D, 86 R, 120 FC, 136/153, 83, 6

[56] References Cited
UNITED STATES PATENTS
| | | | |
|---|---|---|---|
| 3,340,097 | 9/1967 | Hess et al. ................... | 136/120 FC |
| 3,340,098 | 9/1967 | Smith........................... | 136/120 FC |
| 3,483,111 | 12/1969 | Zaromb ......................... | 136/86 D |
| 3,530,006 | 9/1970 | Makishima et al. .......... | 136/120 FC |

*Primary Examiner*—A. B. Curtis
*Assistant Examiner*—H. A. Feeley
*Attorney*—David Toren et al.

[57] ABSTRACT

A high temperature fuel cell is disclosed. The fuel cell is of the kind wherein a porous electrolyte body of compressed zirconium dioxide — $ZrO_2$ — is admixed with additives of alkaline earth metal oxide or rare earth metal oxide. An anode layer of metallic nickel is deposited on a first surface of the electrolyte body which has a rough surface configuration. In accordance with the invention, a cathode layer is deposited on a second surface of the electrolyte body, the cathode layer being formed from a mixture of tin oxide — $SnO_2$ — and antimony oxide — $Sb_2O_3$ —, the amount of antimony oxide in the mixture ranging between about 7 and 30 mole percent.

3 Claims, 3 Drawing Figures

3,754,995

HIGH TEMPERATURE FUEL CELL

FIELD OF INVENTION

The invention relates to the production of high temperature fuel cells of the kind comprising a porous electrolyte body of rough surface configuration which is formed from compressed zirconium dioxide — $ZrO_2$ — admixed with alkaline earth metal oxides or rare earth metal oxides and wherein an anode layer of metallic nickel is deposited, for example by vapor deposition, on a first surface of the electrolyte body while a cathode layer is deposited on a second surface of the electrolyte body, the cathode layer being formed from a mixture of tin oxide — $SnO_2$ — and antimony oxide — $Sb_2O_3$.

BACKGROUND INFORMATION AND PRIOR ART

It has previously been proposed — see German Offenlegungsschrift 1,900,406 — to produce high temperature fuel cells wherein the electrolyte body comprises zirconium dioxide — $ZrO_2$ — and wherein the cathode material for forming the cathode layer on the electrolyte body consists of tin oxide — $SnO_2$ — which is doped with about 1, mole percent of antimony oxide — $Sb_2O_3$. It was assumed in this construction that the doping with the antimony oxide which, in a temperature range below 100°C causes a resistance minimum, would also result in a minimum specific resistance at the high temperature of about 1000°C at which such high temperature fuel cells are operated. Higher antimony oxide contents in the cathode layer were intentionally avoided because it was assumed that the specific resistance or resistivity which determines the internal resistance of the fuel cell and thus also its power loss would be rendered too high. However, it has been found that the adhesion of cathode layers on zirconium dioxide electrolyte bodies is unsatisfactory if the tin oxide is doped with 1 mole percent of antimony oxide. The poor adhesion is due to the significantly different thermal coefficients of expansion of $ZrO_2$ and $SnO_2$. While it is true that the known antimony doped tin oxide cathodes were capable of resisting thermally intermittent conditions between room temperature and an operating temperature of about 1000°C during no load conditions, it was also found that the doped tin oxide cathode layers have a tendency to peel off from the electrolyte body when the cell is subjected to cathodic load conditions. It was thus ascertained that such peeling of the cathode layer takes place at temperatures as low as 800°C during the cooling. It was therefore believed that employment of antimony doped tin oxide cathodes is only feasible if the cell provided with such a cathode is constantly maintained above the critical temperature of 800°C once the cell has been put in operation.

SUMMARY OF THE INVENTION

The primary purpose of the invention is to provide a high temperature fuel cell of the indicated kind which has a cathode layer that does not peel off or otherwise separate from the electrolyte body during cathodic load conditions and thermally intermittent operation.

It is also an object of the invention to provide a fuel cell of the indicated kind which has an extremely long life and wherein the cathode layer does not separate from the electrolyte body even under the most extreme conditions.

Briefly and an accordance with this invention, it has been ascertained that in above objects are superiorly achieved if the cathode layer deposited on the electrolyte body contains at least about 7 mole percent and at the most about 30 mole percent of antimony oxide in admixture with the tin oxide.

According to a preferred embodiment, the amount of antimony oxide in the cathode layer is between about 8 and 10 mole percent.

In respect of the electrolyte body, it has been found that excellent results are obtained if the zirconium dioxide contains additives in the form of about 4 mole percent of yttrium oxide $Y_2O_3$ and 4 mole percent of ytterbium oxide $Yb_2O_3$.

By reason of the inventive relatively high doping of the tin oxide with at least 7 mole percent of antimony oxide, the temperature-resistance coefficient is surprisingly smaller in comparison to that of the known cathode layers containing 1 mole percent of antimony oxide. As a result thereof and at the high operating temperatures of such fuel cells, an internal resistance is created which is in the same order of magnitude as in the known fuel cells having cathodes containing but 1 mole percent of antimony oxide.

Surprisingly, the inventive cathode layer adheres permanently and superiorly to the surfaces of the zirconium dioxide body which preferably should have a rough configuration. in this manner the peeling of the cathode layer from the electrolyte body is completely prevented even during cooling and extreme temperature fluctuations.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

IN THE DRAWINGS

Figure 1:
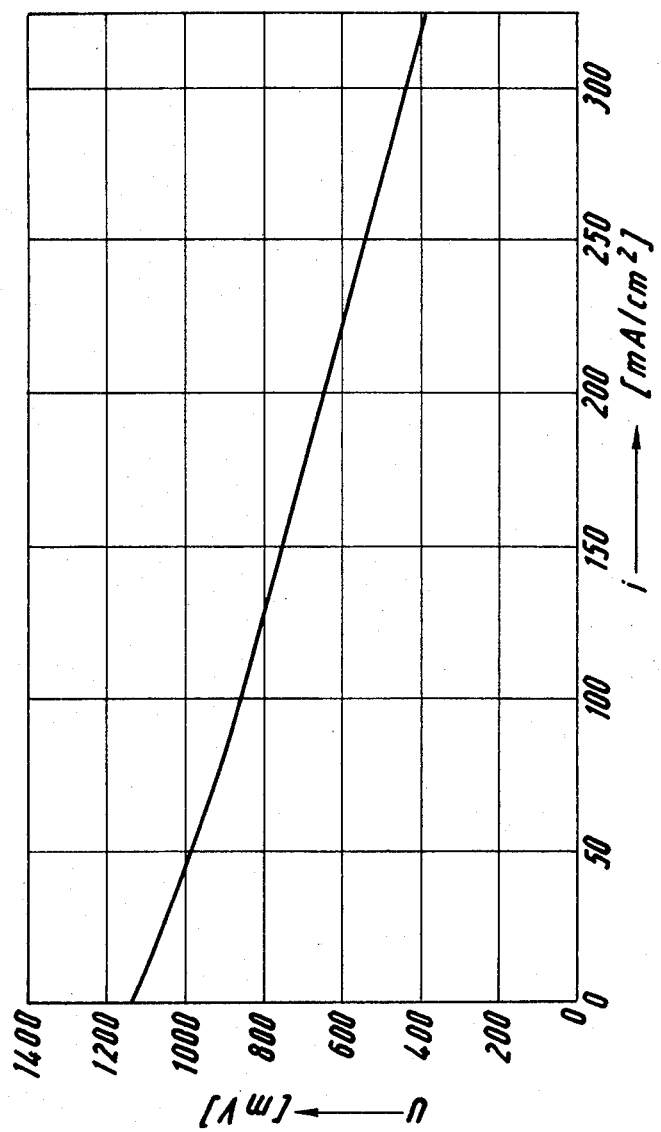
FIG. 1 is a graph showing the current-voltage characteristic of an inventive fuel cell at an operating temperature of 1000°C and after an operating period of 20 hours.

The current-voltage characteristics represented in FIG. 1 were measured at a disc shaped high temperature fuel cell which had been prepared in the following manner:

In a first process step, zirconium dioxide powder — $ZrO_2$ — containing additions of 4 mole percent of yttrium oxide — $Y_2O_3$ — and 4 mole percent of ytterbium oxide — $Yb_2O_3$ — as well as 3 percent by weight of ammonium bicarbonate — $(NH_4)HCO_3$ — was filled into a cylindrical press mold. An additional layer of a thickness of 0.1 mm was deposited on one end face of the compressed blank. This layer consisted of zirconium dioxide powder containing 4 percent of $Y_2O_3$ and 4 percent of $Yb_2O_3$ as well as 25 percent by weight of ammonium carbonate. The layer was formed by passing the indicated mixture through a sieve of fine mesh size with the compressed blank below the sieve. Thereafter a layer of 1 mm thickness of pure ammonium bicarbonate was superimposed onto the zirconium dioxide layer referred to. This ammonium bicarbonate layer fixed the surface form of the loose zirconium dioxide layer. After compression, the ammonium bicarbonate was expelled from the compressed blank at a temperature of 120°C. The disc thus obtained had a diameter of 32 mm and a height of 1.3 mm. The end face of the disc which had been enriched with ammonium carbonate exhibited a wafer-like structure and had a strongly porous roughened consistency.

In a second process step the zirconium dioxide disc was heated by substrate heating to 735°C and the porous rough end face of the disc was coated with a deposit obtained by dissolving a mixture of 140 grams of $SnCl_4$ and 12 grams of $SbCl_3$ in 800 mg of water and subsequent vaporization of the solution in a furnace at 330°C. The cathode layer thus obtained upon cooling contained 8.9 mole percent of $Sb_2O_3$ and 91.1 mole percent of $SnO_2$. The cathode layer was applied in an amount corresponding to 17 mg of oxide per square centimeter of electrolyte end face.

The other end face of the zirconium dioxide disc was provided with an anode layer in a third step. This was accomplished by means of the plasma spray procedure and metallic nickel was deposited. The total amount of nickel is not critical for the operation of the cell.

The high temperature fuel cell produced in accordance with the above was subsequently operated at a temperature of 1000°C with hydrogen as fuel gas and with the oxygen of the ambient air as oxidator. The current-voltage characteristic measured after an operating period of 20 hours is represented by the graph of FIG. 1. As is clear from the graph, the terminal voltage $U_o$ during no load ($i=0$) was 1140 mV and was reduced to half this value (570 mV) at a load with a current density of $i=230$ mA/cm$^2$. The specific useful output of the fuel cell amounted to 136 mW/cm$^2$.

Figure 2:
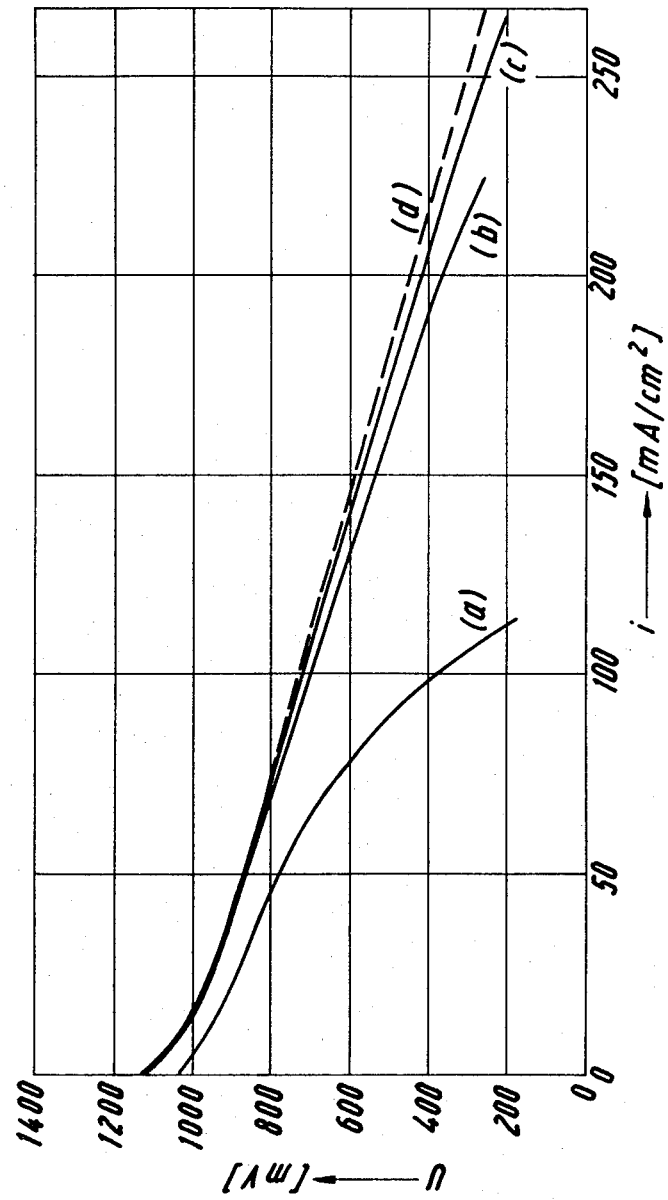
FIG. 2 shows a current-voltage characteristic of an inventive fuel cell at an operating temperature of 1000°C and after operating periods of a. 3 hours
b. 96 hours
c. 262 hours, and
d. 262 hours immediately after cooling down to room temperature and subsequent reheating to operating temperature.

FIG. 2 indicates the current-voltage characteristic of a further fuel cell. This latter fuel cell was produced in a manner similar to the first fuel cell but contained a lesser addition of ammonium bicarbonate in the layer which was applied by sieving and which had a lesser surface roughness. The cell was operated uninterruptedly for 262 hours at a constant terminal voltage of 400 mV and the current-voltage characteristic was measured after 3 hours (FIG. 2a), after 96 hours (FIG. 2b) and after 262 hours (FIG. 2c). As is clear from the graph of FIG. 2, the current-voltage characteristic has first a relatively poor appearance FIG. 2a). However, with increasing length of operation the characteristic significantly improved in surprising manner. After a period of 262 hours, the cell of FIG. 2 was cooled down to room temperature and was again put into operation. The current and voltage course which was measured immediately after the renewed operation is represented in FIG. 2d. As is seen from the graph, the course of the characteristic after renewed operation is almost identical with that prior to the shut-off (FIG. 2c). It follows that thermally intermittent operation of the cell does not influence the behavior of the cell during operation.

Figure 3:
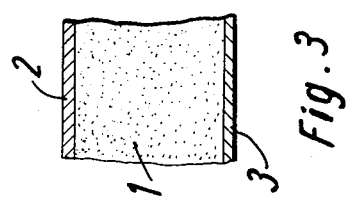
FIG. 3 is a fragmentary sectional view of an inventive fuel cell.

FIG. 3 is a cross-sectional view through an inventive cell. Reference numeral 1 indicates the electrolyte body of zirconium dioxide — $ZrO_2$ — enriched with yttrium oxide and ytterbium oxide while reference numeral 2 indicates the anode layer of nickel. The cathode layer of tin oxide and 7 to 30 mole percent of antimony oxide is indicated by reference numeral 3.

It will be appreciated that the invention is not limited to electrolyte bodies in disc form. In the same manner tube-shaped electrolyte bodies or bodies of semicircular cross section may, of course, be manufactured. The term "end face" as used hereinbefore in respect of disc-shaped electrolyte bodies thus would then correspondingly apply to the outer and inner surfaces of tube-shaped bodies or bodies of channel shape, to wit, bodies with semicircular cross-section.

The invention thus provides for the first time a high temperature fuel cell having a zirconium dioxide containing electrolyte body and a tin oxide containing cathode which is capable of withstanding constant cathodic loads and also thermally intermittent operation. In this context should be appreciated that the use of tin oxide containing cathodes has many advantages particularly from an economical point of view since the production of cathode layers which predominantly consist of tin oxide, is much less expensive than that of cathode layers of other materials. Thus, high temperature fuel cells wherein the cathodes are formed of noble metals are, of course, much more expensive to produce. Due to the fact that the inventive fuel cell maintains its superior operating characteristic for long periods of operation, the invention for the first time makes it possible to use high temperature fuel cells in an economically feasible manner.

What is claimed is:

1. In a high temperature fuel cell of the kind comprising a porous electrolyte body of compressed $ZrO_2$ admixed with additives of alkaline earth metal oxide or rare earth metal oxide and having an anode layer of metallic nickel deposited on a first surface of the electrolyte body, and a cathode layer deposited on a second surface of said electrolyte body, the improvement which comprises that said cathode layer is a mixture of $SnO_2$ and $Sb_2O_3$, the amount of $Sb_2O_3$ in the mixture ranging between about 7 and 30 mole percent.

2. The improvement as claimed in claim 1, wherein the amount of $Sb_2O_3$ ranges between about 8 and 10 mole percent.

3. In a high temperature fuel cell of the kind comprising a porous electrolyte body of compressed $ZrO_2$, said porous electrolyte body having a rough surface configuration and having a metallic anode layer deposited on a first surface of the electrolyte body, and a cathode layer deposited on a second surface of said electrolyte body, the improvement which comprises an admixture of said $ZrO_2$ with about 4 mole percent of $Y_2O_3$ and 4 mole percent of $Y_2O_3$ and said cathode layer is a mixture of $SnO_2$ and $Sb_2O_3$ the amount of $Sb_2O_3$ in the mixture ranging between about 7 and 30 mole percent.

* * * * *